United States Patent
Watanabe et al.

(10) Patent No.: US 8,687,327 B2
(45) Date of Patent: Apr. 1, 2014

(54) ELECTRONIC SYSTEM FOR CONVERTING DC VOLTAGE INTO AC VOLTAGE

(75) Inventors: Kazunori Watanabe, Kariya (JP); Tsuneo Maebara, Nagoya (JP); Yasunari Tanimura, Takahama (JP); Noriyuki Takagi, Anjo (JP); Yoshiyuki Hamanaka, Kariya (JP); Junichi Fukita, Anjo (JP)

(73) Assignee: Denso Corporation, Kariya (JP)

( * ) Notice: Subject to any disclaimer, the term of this patent is extended or adjusted under 35 U.S.C. 154(b) by 115 days.

(21) Appl. No.: 13/227,724

(22) Filed: Sep. 8, 2011

(65) Prior Publication Data

US 2012/0075753 A1     Mar. 29, 2012

(30) Foreign Application Priority Data

Sep. 24, 2010    (JP) ................................. 2010-214141

(51) Int. Cl.
     *H02H 7/12*         (2006.01)

(52) U.S. Cl.
     USPC .......................................................... 361/18

(58) Field of Classification Search
     USPC .......................................................... 361/18
     See application file for complete search history.

(56) References Cited

U.S. PATENT DOCUMENTS

| | | | | |
|---|---|---|---|---|
| 3,927,363 | A | * | 12/1975 | Mitchell et al. .................. 363/22 |
| 6,995,567 | B2 | * | 2/2006 | Kawashima et al. .......... 324/522 |
| 2007/0103832 | A1 | * | 5/2007 | Ohshima ....................... 361/93.1 |

FOREIGN PATENT DOCUMENTS

| | | | |
|---|---|---|---|
| JP | 3430878 | | 5/2003 |
| JP | 2006-050865 A | | 2/2006 |
| JP | 2009-60358 | * | 3/2009 ............. H03K 17/08 |

OTHER PUBLICATIONS

Fukuda, J; Overcurrent Protection Circuit and Power Conversion System (English Translation of JP 2009-60358), Mar. 2009.*
Japanese Office Action dated Aug. 30, 2012, issued in corresponding Japanese Application No. 2010-214141, with English translation.

* cited by examiner

*Primary Examiner* — Jared Fureman
*Assistant Examiner* — Kevin J Comber
(74) *Attorney, Agent, or Firm* — Nixon & Vanderhye PC (57) ABSTRACT

An electronic system has IGBT, on driving FET and off driving FET connected with the gate of the IGBT, and a control circuit. The on driving FET in an on state supplies electric charge to the IGBT gate. The off driving FET in an on state releases the charge from the GET gate. The control circuit controls each of the on FETs according to a driving signal to be set in the on and off states every switching period of time and to control the voltage at the IGBT gate. When on-failure occurs in the on driving FET set in the on state so as to keep the on driving FET in the on state in spite of control of the control circuit, the control circuit controls a controlled element other than the off driving FET to set the IGBT in the off state.

12 Claims, 5 Drawing Sheets

ELECTRONIC SYSTEM FOR CONVERTING DC VOLTAGE INTO AC VOLTAGE

CROSS-REFERENCE TO RELATED APPLICATION

This application is based upon and claims the benefit of priority of the prior Japanese Patent Application 2010-214141 filed on Sep. 24, 2010, so that the contents of which are incorporated herein by reference.

BACKGROUND OF THE INVENTION

1. Field of the Invention

The present invention relates to an electronic system in which a high direct current (dc) voltage of a high voltage battery is converted into a three-phase alternating current (ac) voltage in switching elements under control of a control unit to supply electric power of the ac voltage to a motor for a vehicle.

2. Description of Related Art

An electric power converter having switching elements and a control circuit is disclosed in Published Japanese Patent Specification No 3,430,878. In this Specification, the converter has an insulated-gate bipolar transistor (IGBT), a first metal-oxide-semiconductor field effect transistor (MOSFET), a second MOSFET, a third MOSFET and a control circuit. The first MOSFET has a source connected with a power source of the driving circuit, a drain connected with a gate of the IGBT and a gate connected with the control circuit. Each of the second and third MOSFETs has a source connected with an emitter of the IGBT, a drain connected with a gate of the IGBT and a gate connected with the control circuit.

The control circuit controls the three MOSFETs according to a driving signal sent from an outer part to drive the IGBT. When receiving the driving signal instructing the IGBT to be set in the on state, the control circuit turns on the first MOSFET while turning off the second MOSFET. Therefore, electric charge is supplied from the power source to the gate of the IGBT. As a result, the gate voltage of the IGBT becomes higher than an on-off threshold value, and the IGBT is turned on.

In contrast, when receiving the driving signal instructing the IGBT to be set in the off state, the control circuit turns off the first MOSFET while turning on the second MOSFET. Therefore, the charge accumulated at the gate of the IGBT is released to the ground through the second MOSFET. As a result, the gate voltage of the IGBT becomes lower than the on-off threshold value, and the IGBT is turned off. Further, when the gate voltage becomes equal to or lower than a predetermined value lower than the on-off threshold value, the control circuit turns on the third MOSFET. Therefore, the charge of the gate of the IGBT is further released to the ground through the third MOSFET. As a result, the IGBT keeps being in the off state.

However, even when the first MOSFET set in the on state receives a turning-off instruction from the control circuit so as to be turned off, the first MOSFET sometimes fails in being turned off so as to keep being in the on state. This failure is called an on-failure in this specification. Therefore, even when the second MOSFET is turned on, the failed first MOSFET keeps the gate voltage of the IGBT at a high value. In this case, the IGBT is set in the abnormal state. When the abnormal state of the IGBT is continued, the IGBT continues generating heat, and the IGBT is sometimes damaged or broken by the generated heat.

SUMMARY OF THE INVENTION

An object of the present invention is to provide, with due consideration to the drawbacks of the conventional electric power converter, an electronic system which, even when an on driving switching element set in the on state to charge a control terminal of a second switching element fails in being turned off, prevents the second switching element charged through the on driving switching element from being broken by heat generated in the second switching element.

According to a first aspect of this invention, the object is achieved by the provision of an electronic system, comprising a first switching element having a control terminal, an on driving switching element connected with the control terminal of the first switching element, an off driving switching element connected with the control terminal of the first switching element, and a control circuit. The first switching element is driven by changing a voltage of the control terminal in response to electric charge supplied or released to/from the control terminal. The on driving switching element is set in an on state to supply electric charge to the control terminal of the first switching element. The off driving switching element is set in an on state to release the electric charge, supplied by the on driving switching element, from the control terminal of the first switching element. The control circuit controls each of the on driving switching element and the off driving switching element according to a driving signal to set the switching element in the on or off state and to control the voltage of the control terminal of the first switching element. The control circuit also controls the driving of the first switching element. The control circuit controls a controlled element other than the off driving switching element to set the first switching element in an off state when an on-failure occurs in the on driving switching element set in the on state so as to keep the on driving switching element in the on state in spite of the control of the control circuit.

With this structure of the electronic system, when an on-failure occurs in the on driving switching element set in the on state, the on driving switching element keeps being in the on state regardless of whether the control circuit controls the on driving switching element to be set in the off state. In this case, even when the control circuit controls the off driving switching element to be set in the on state and to release the electric charge from the control terminal of the first switching element, the on driving switching element continues supplying electric charge to the control terminal of the first switching element. Therefore, assuming that no controlled element other than the off driving switching element acts so as to set the first switching element in the off state, the control terminal of the first switching element is maintained at a high voltage in response to the electric charge supplied by the on driving switching element. As a result, the control circuit cannot control the first switching element to be set in the off state. However, in the present invention, when an on-failure occurs in the on driving switching element set in the on state, the control circuit controls a controlled element other than the off driving switching element to set the first switching element in an off state.

Accordingly, even when the on-failure sets the electronic system in an abnormal state in which the control circuit cannot set the first switching element in the off state only by controlling the off driving switching element, the control circuit can set the first switching element in the off state by controlling the controlled element other than the off driving switching element, and the electronic system can prevent the first switching element from being broken by heat generated in the first switching element.

DETAILED DESCRIPTION OF THE PREFERRED EMBODIMENTS

Embodiments of the present invention will now be described with reference to the accompanying drawings, in which like reference numerals indicate like parts, members or elements throughout the specification unless otherwise indicated.

Figure 1:
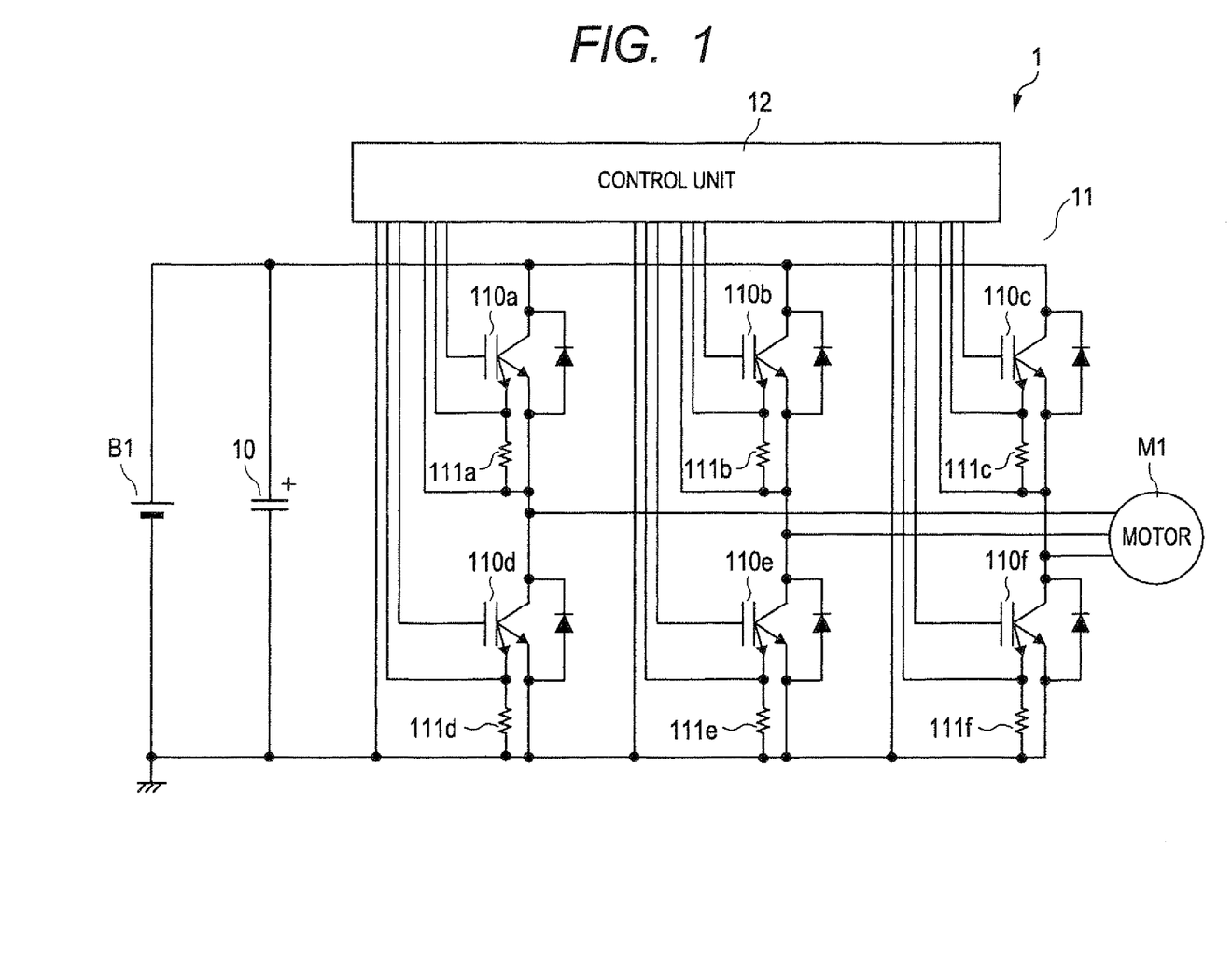
FIG. 1 is a circuit view of a motor control system representing an electronic system according to the first embodiment of the present invention.

In each embodiment, a motor control system mounted on a vehicle to control a motor for driving the vehicle is applied as an electronic system according to the present invention.
First Embodiment A circuit view of a motor control system 1 according to the first embodiment is shown in FIG. 1. As shown in FIG. 1, the control system (i.e., an electronic system) 1 converts a high direct current (dc) voltage (e.g., 288V) applied from a high voltage battery B1 insulated from a vehicle body into a three-phase alternating current (ac) voltage, and applies this ac voltage to a motor M1 for driving a vehicle to control the driving of the motor M1. The system 1 has a smoothing capacitor 10, an inverter 11 and a control unit 12.

The smoothing capacitor 10 smoothes the high dc voltage of the battery B1. One end of the capacitor 10 is connected with a positive terminal of the battery B1, while the other end of the capacitor 10 is connected with a negative terminal of the battery B1. Further, the negative terminal of the battery B1 is connected with the ground prepared for the battery B1 so as to be insulated from the vehicle body.

The inverter 11 converts the dc voltage smoothed by the capacitor 10 into a three-phase ac voltage to supply electric power of this ac voltage to the motor M1. The inverter 11 has a plurality of insulated-gate bipolar transistors (IGBTs) 110a, 110b, 110c, 110d, 110e and 110f, respectively, acting as switching elements. A diode is located in parallel to each IGBT. The control unit 12 controls a voltage applied to the gate of each IGBT to repeatedly turn on and off the IGBT. When each IGBT is repeatedly turned on and off, the dc voltage smoothed by the capacitor 10 is converted into a three-phase ac voltage. More specifically, the collector of the IGBT 110d (i.e., a first switching element) is connected with the emitter of the IGBT 110a (i.e., a second switching element), the collector of the IGBT 110e is connected with the emitter of the IGBT 110b, and the collector of the IGBT 110f is connected with the emitter of the IGBT 110c. Therefore, the IGBT 110a to 110c are, respectively, connected with the IGBT 110d to 110f in series. The series of IGBT 110a and 110d, the series of IGBT 110b and 110e and the series of IGBT 110c and 110e are connected in parallel to one another. The collectors of the IGBTs 110a to 110c are connected with the positive terminal of the battery B1 and one end of the capacitor 10. The emitters of the IGBTs 110d to 110f are connected with the negative terminal of the battery B1 and the other end of the capacitor 10. The gates (i.e., control terminals) and emitters of the IGBTs 110a to 110f are connected with the control unit 12 together so as to receive driving signals from the control unit 12. Further, a serial connecting point between the IGBT 110a and 110d, a serial connecting point between the IGBT 110b and 110e and a serial connecting point between the IGBT 110c and 110f are connected with the motor M1 together.

Further, each IGBT has a current sensing terminal, and the inverter 11 has a plurality of current sensing resistors 111a, 111b, 111c, 111d, 111e and 111f. Ends of the resistors 111a to 111f are, respectively, connected with the current sensing terminals of the IGBT 110a to 110f. The other ends of the resistors 111a to 111f are, respectively, connected with the emitters of the IGBT 110a to 110f. Each resistor converts the current flowing through the corresponding IGBT into a voltage. More specifically, each resistor converts the current flowing through the corresponding current sensing terminal into a voltage. Further, the ends of each resistor are connected with the control unit 12 together so as to detect the voltage in the control unit 12.

The control unit 12 is connected with the gates and emitters of the IGBT 110a to 110f to control the IGBT 110a to 110f. Further, the control unit 12 is connected with both ends of each current sensing resistor to detect a current flowing through the corresponding IGBT.

Figure 2:
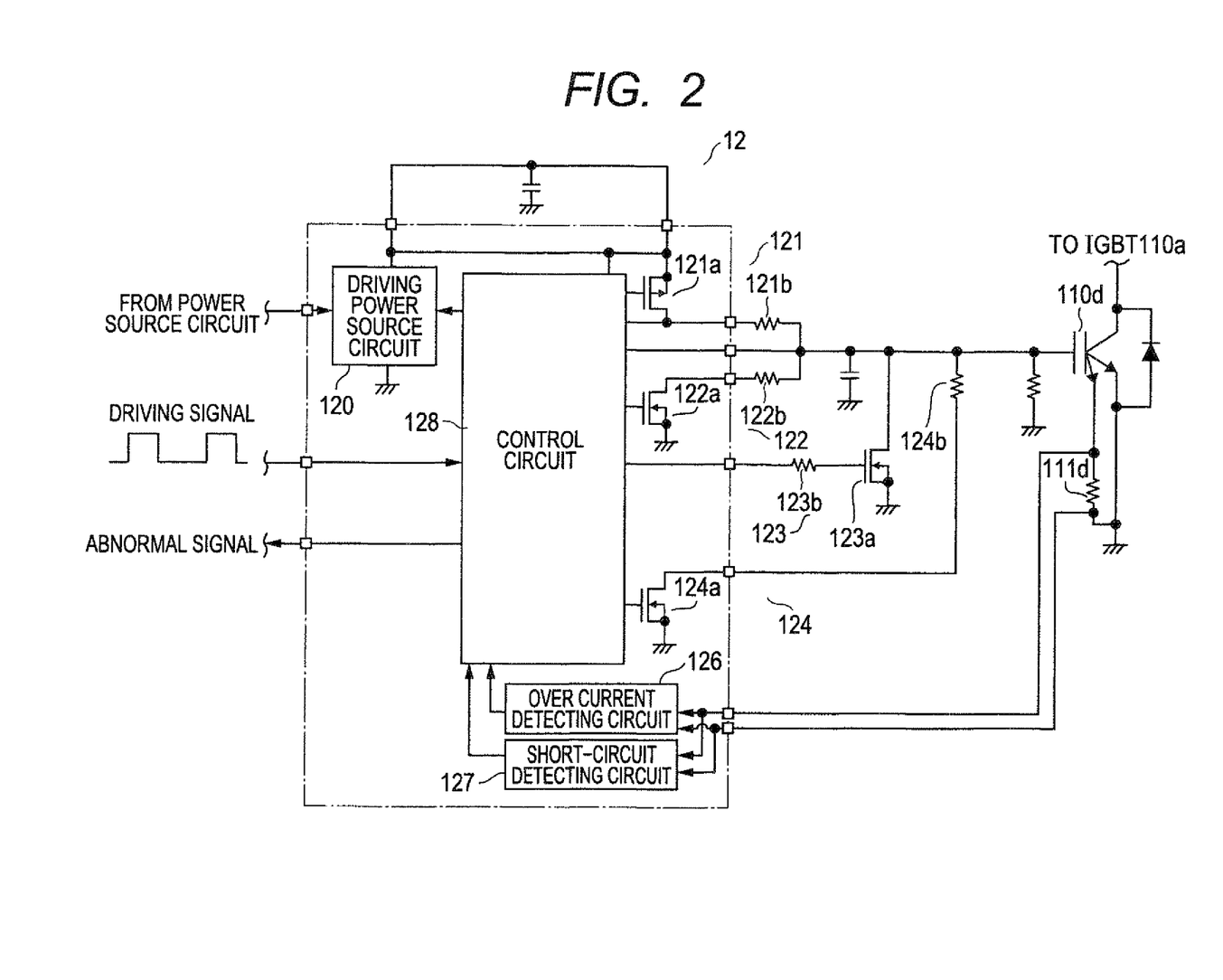
FIG. 2 is a circuit view of a control unit in the motor control system shown in FIG. 1.

The control unit 12 will be described in detail with reference to FIG. 2. FIG. 2 is a circuit view of the control unit 12 for controlling the IGBT 110d representing the IGBTs 110a to 110f. As shown in FIG. 2, the control unit 12 has a driving power source circuit 120 for outputting a voltage signal to the IGBT 110d to drive the IGBT 110d, an on driving circuit 121 for driving the IGBT 110d so as to be turned on, an off driving circuit 122 for driving the IGBT 110d so as to be turned off, an off holding circuit (i.e., an off holding switching element) 123 for holding the IGBT 110d in the off state, a cutoff circuit 124 for preventing an abnormal electric current, extraordinarily larger than an electric current normally flowing through the IGBT 110d, from flowing through the IGBT 110d, an overcurrent detecting circuit 126 for detecting an overcurrent flowing through the IGBT 110d as the abnormal current, a short-circuit detecting circuit 127 for detecting the IGBT 110d set in a short-circuit state, and a control circuit 128 for controlling the circuits 120 to 124, 126 and 127. The control unit 12 further has the same circuits as the circuits 120 to 124, 126 and 127 to control each of the other IGBTs 110a, 110b, 110c, 110e and 110f. The control unit 12 further has a capacitor and a resister, and the capacitor and resister are connected with the gate of the IGBT 110d in parallel to each other and are grounded.

The driving power source circuit 120 stabilizes a voltage of a driving power supplied from a power source circuit (not shown) through an input terminal of the circuit 120 and outputs the stabilized voltage to the gate of the IGBT 110d through the on driving circuit 121 to turn on the IGBT 110d. The circuit 120 stops outputting the voltage according to an instruction received from the control circuit 128 through a control terminal of the circuit 120. A positive terminal of the circuit 120 is connected with the circuit 121, and a negative terminal of the circuit 120 is connected with the ground prepared for the battery B1 so as to be insulated from the vehicle body. Therefore, the negative terminal of the circuit 120 is substantially connected with the emitter of the IGBT 110d through the ground.

The on driving circuit 121 charges the gate of the IGBT 110d to increase the gate voltage of the IGBT 110d to a value higher than an on-off threshold value. Therefore, the IGBT 110d is turned on by the circuit 121. The circuit 121 has an on driving FET (i.e., an on driving switching element) 121a formed of a p-channel metal-oxide-semiconductor field effect transistor (MOSFET) and an on driving resistor 121b. The source (i.e., an input terminal) of the on driving FET 121a is connected with the positive terminal of the circuit 120. The drain (i.e., an output terminal) of the on driving FET 121a is connected with the gate of the IGBT 110d through the resistor 121b. The gate (i.e., a control terminal) of the on driving FET 121a is connected with the control circuit 128. When the control circuit 128 controls the gate voltage of the on driving FET 121a, the on driving FET 121a is driven to be turned on or off. When the on driving FET 121a is set in the on state, electric charge is sent from the circuit 120 to the gate of the IGBT 110d through the on driving FET 121a and the resistor 121b. When the on driving FET 121a is set in the off state, electric charge sent to the IGBT 110d is stopped.

The off driving circuit 122 discharges the gate of the IGBT 110d to turn off the IGBT 110d by decreasing the gate voltage of the IGBT 110d to a value lower than the on-off threshold value. The circuit 122 has an off driving FET (i.e., an off driving switching element) 122a formed of an n-channel MOSFET and an off driving resistor 122b. The source of the off driving FET 122a is connected with the ground prepared for the battery B1 so as to be insulated from the vehicle body. Therefore, the source of the off driving FET 122a is substantially connected with the negative terminal of the circuit 120 and the emitter of the IGBT 110d through the ground. The drain of the off driving FET 122a is connected with the gate of the IGBT 110d through the resistor 122b. The gate of the off driving FET 122a is connected with the control circuit 128.

When the gate voltage of the IGBT 110d is decreased to a value equal to or lower than an off holding threshold value which is lower than the on-off threshold value, the off holding circuit 123 releases or discharges the electric charge accumulated at the gate of the IGBT 110d to the ground at a flow rate higher than the flow rate of the electric charge released from the IGBT 110d by the off driving circuit 122. Therefore, the off holding circuit 123 holds the gate voltage of the IGBT 110d at a value lower than the on-off threshold value to hold the IGBT 110d in the off state. The circuit 123 has an off holding FET (i.e., an off holding switching element) 123a formed of an n-channel MOSFET and a gate resistor 123b. The source of the FET 123a is connected with the ground prepared for the battery B1 so as to be insulated from the vehicle body. Therefore, the source of the FET 123a is substantially connected with the negative terminal of the circuit 120 and the emitter of the IGBT 110d through the ground. The drain of the FET 123a is connected with the gate of the IGBT 110d. The gate of the FET 123a is connected with the control circuit 128 through the resistor 123b.

The overcurrent detecting circuit 126 judges whether or not an overcurrent flows through the IGBT 110d. The input terminal of the circuit 126 is connected with one end of the resistor 111d connected with the current sensing terminal of the IGBT 110d. The output terminal of the circuit 126 is connected with the control circuit 128. When a current flowing through the IGBT 110d becomes larger than an overcurrent threshold value, the circuit 126 detects that an overcurrent flows through the IGBT 110d, and informs the circuit 128 of this detection.

The short-circuit detecting circuit 127 judges whether or not the IGBT 110d is set in a short-circuit state. The input terminal of the circuit 127 is connected with one end of the resistor 111d connected with the current sensing terminal of the IGBT 110d. The output terminal of the circuit 127 is connected with the control circuit 128. When a current flowing through the IGBT 110d becomes larger than a short-circuit threshold value, the circuit 126 detects that a short-circuit current flows through the IGBT 110d so as to set the IGBT 110d in a short-circuit state and judges that the IGBT 110a and the IGBT 110d are set in the on state together. The circuit 126 informs the circuit 128 of this detection. The short-circuit threshold value is higher than the overcurrent threshold value.

The cutoff circuit 124 turns off the IGBT 110d when an abnormal current (e.g., an overcurrent or a short-circuit current) flows through the IGBT 110d. The circuit 124 has a cutoff FET 124a formed of an n-channel MOSFET and a cutoff resistor 124b. The source of the FET 124a is connected with the ground prepared for the battery B1 so as to be insulated from the vehicle body. Therefore, the source of the FET 124a is substantially connected with the negative terminal of the circuit 120 and the emitter of the IGBT 110d through the ground. The drain of the FET 124a is connected with the gate of the IGBT 110d through the resistor 124b. The gate of the FET 124a is connected with the control circuit 128. When the circuit 126 or 127 detects an overcurrent or a short-circuit current flowing through the IGBT 110d, the control circuit 128 controls the gate voltage of the FET 124a to be turned on, and electric charge at the gate of the IGBT 110d is released to the ground through the FET 124a and the resistor 124b. Therefore, the gate voltage of the IGBT 110d becomes lower than the on-off threshold value, and the IGBT 110d is turned off. As compared with the charge release in the off driving circuit 122, the flow rate of electric charge released from the gate of the IGBT 110d by the circuit 124 is low.

The control circuit 128 is connected with the gate of the on driving FET 121a and the gate of the FET 122a so as to control the on driving circuit 121 and the off driving circuit 122 according to a driving signal received from an outer part to drive the IGBT 110d. Further, the circuit 128 is connected with the control terminal of the driving power source circuit 120 and the source and drain of the FET 121a. The circuit 128 judges, based on the gate voltage of the FET 121a and the difference between the drain voltage and the source voltage of the FET 121a, whether or not an on-failure has occurred in the FET 121a so as to keep the FET 121a in the on state regardless of the off instruction sent to the gate of the FET 121a. When an on failure occurs in the FET 121a, the control unit 12 is set in an abnormal state in which the off driving FET 122a turned on cannot turn off the IGBT 110d, and the circuit 128 detects this on-failure occurring in the FET 121a. In this case, the circuit 128 stops the operation of the circuit 120 to stop supplying or charging the electric charge from the circuit 120 to the gate of the IGBT 110d through the FET 121a, to release the electric charge from the gate of the IGBT 110d to the ground through the FET 122a, and to compulsorily turn off the IGBT 110d. The circuit 128 further externally outputs an abnormal signal, different from a signal normally output, in response to the occurrence of the on-failure.

Further, the circuit 128 is connected with the gate of the IGBT 110d to receive the gate voltage of the IGBT 110d and is connected with the gate of the FET 123a through the resistor 123b to control the off holding circuit 123 according to the received gate voltage of the IGBT 110d. The circuit 128 controls the circuit 123 to hold the IGBT 110d in the off state.

Moreover, the control circuit 128 is connected with the output terminals of the detecting circuits 126 and 127. When the circuit 128 receives a detection signal, indicating that the overcurrent or short-circuit current flowing through the IGBT 110d is detected, from the circuit 126 or 127, the circuit 128 controls the cutoff circuit 124 to turn off the IGBT 110d.

Furthermore, the control circuit 128 is connected with the gate of the cutoff FET 124a to control the cutoff circuit 124.

The circuit 120, the FET 121a, the FET 122a, the FET 124a, the detecting circuits 126 and 127 and the control circuit 128 are integrally arranged as an integrated circuit (IC).

Next, an operation of the motor control system 1 will be described with reference to FIG. 1. As shown in FIG. 1, when an ignition switch (not shown) of the vehicle is turned on, an operation of the control system 1 is started. The high dc voltage of the battery B1 is smoothed by the capacitor 10 and is applied to the inverter 11. The control unit 12 controls the IGBTs 110a to 110f composing the inverter 11 according to a driving signal received from an outer part to set each of the IGBTs 110a to 110f in each of the on and off states every switching period of time and to convert the smoothed dc voltage into a three-phase ac voltage. Then, the inverter 11 supplies electric power of the three-phase ac voltage to the motor M1. Therefore, the system 1 controls the operation of the motor M1.

Next, a driving operation of the IGBT 110d representing the IGBTs 110a to 110f will be described with reference to FIG. 2. As shown in FIG. 2, the control circuit 128 controls the on driving FET 121a and the off driving FET 122a according to a driving signal received from an outer part to turn on and off the IGBT 110d every switching period of time. When the driving signal indicates the turning-on of the IGBT 110d, the control circuit 128 turns on the FET 121a and turns off the FET 122a. Therefore, electric charge is sent from the power source circuit 120 to the gate of the IGBT 110d through the FET 121a and the resistor 121b, the gate voltage of the IGBT 110d becomes higher than the on-off threshold value, and the IGBT 110d is turned on.

In contrast, when the driving signal indicates the turning-off of the IGBT 110d, the control circuit 128 controls the FET 121a to be turned off and controls the FET 122a to be turned on. Therefore, the gate of the IGBT 110d is electrically disconnected from the circuit 120 by the turned-off FET 121a, and the electric charge of the gate of the IGBT 110d is released to the ground through the resistor 122b and the turned-on FET 122a. In this case, the gate voltage of the IGBT 110d becomes lower than the on-off threshold value, and the IGBT 110d is turned off. Further, when the gate voltage of the IGBT 110d becomes equal to or lower than the off holding threshold value which is lower than the on-off threshold value, the control circuit 128 turns on the off holding FET 123a. Therefore, the electric charge of the gate of the IGBT 110d is further released to the ground through the turned-on FET 123a, and the off state of the IGBT 110d is reliably held.

Next, an operation performed when the control circuit 128 judges to be set in an abnormal state due to an on-failure occurred in the on driving FET 121a will be described with reference to FIG. 2. The FET 121a is normally turned off when the voltage applied to the gate of the FET 121a becomes lower than an on-off value. However, in the case where an on-failure has occurred in the turned-on FET 121a, even when the control circuit 128 applies a voltage lower than the on-off value to the gate of the FET 121a, the FET 121a is still set in the on state, and the power supply circuit 120 continues supplying or charging electric charge to the gate of the IGBT 110d through the FET 121a while the electric charge accumulated at the gate of the IGBT 110d is released to the ground through the off driving FET 122a. The control circuit 128 can detect based on the difference between the drain voltage and the source voltage of the FET 121a that the FET 121a is still set in the on state, and can detect that the gate voltage of the FET 121a becomes lower than the on-off value. In this situation, assuming that no component other than the off driving FET 122a acts so as to turn off the IGBT 110d, the control circuit 128 cannot control the IGBT 110d to be turned off. To solve this problem, a component (i.e., a controlled element) other than the off driving FET 122a acts so as to turn off the IGBT 110d. Therefore, the off driving FET 122a can turn off the IGBT 110d in cooperation with the component other than the off driving FET 122a. Further, when the control circuit 128 detects the occurrence of an on-failure in the on driving FET 121a, the circuit 128 externally outputs an abnormal signal, different from a signal normally output, to inform an outer part that an on-failure has occurred in the on driving FET 121a.

For example, when the control circuit 128 detects based on the difference between the drain voltage and the source voltage of the FET 121a that the FET 121a is still set in the on state, while detecting that the FET 121a has the gate voltage lower than the on-off value so as to turn off the IGBT 110d, the control circuit 128 judges that an on-failure has occurred in the FET 121a, and stops the operation of the power source circuit 120 to stop the supply of electric charge from the circuit 120 to the gate of the IGBT 110d. In this case, the electric charge accumulated at the gate of the IGBT 110d is released to the ground through the turned-on FET 122a. Therefore, the combination of the off driving FET 122a and the control circuit 128 stopping the supply of electric charge from the circuit 120 can decrease the gate voltage of the IGBT 110d at a value lower than the on-off threshold value to turn off the IGBT 110d.

Further, when the current flowing through the IGBT 110d becomes larger than an overcurrent threshold value, the detecting circuit 126 judges that an overcurrent flows through the IGBT 110d, and the control circuit 128 turns on the cutoff FET 124a. Therefore, electric charge is released from the gate of the IGBT 110d to the ground through the resistor 124b and the FET 124a. In this case, as compared with the charge release in the off driving circuit 122, the gate voltage of the IGBT 110d is gradually decreased to become lower than the on-off threshold value, and the IGBT 110d is turned off.

Moreover, when the current flowing through the IGBT 110d becomes larger than a short-circuit threshold value, the detecting circuit 127 judges that a short-circuit current flows through the IGBT 110d, and the control circuit 128 turns on the cutoff FET 124a in the same manner as in the overcurrent judgment. Therefore, the IGBT 110d is turned off.

Next, effects in the control system 1 will be described.

In this embodiment, in the case of the occurrence of an on-failure in the on driving FET 121a, although the off driving FET 122a is turned on to release electric charge from the gate of the IGBT 110d to the ground through the FET 122a, the power source circuit 120 continues supplying electric charge to the gate of the IGBT 110d through the FET 121a. Therefore, assuming that no component other than the off driving FET 122a acts so as to turnoff the IGBT 110d, the control circuit 128 cannot control the IGBT 110d to be turned off. To solve this problem, a component other than the off driving FET 122a acts so as to turn off the IGBT 110d. Therefore, the off driving FET 122a can turn off the IGBT 110d in cooperation with the component other than the off driving FET 122a. Accordingly, even when the control system 1 is set in an abnormal state in which the control circuit 128 cannot turn off the IGBT 110d due to an on-failure occurring in the on driving FET 121a, the control system 1 can prevent the IGBT 110*d* from being damaged or broken by heat generated in the IGBT 110*d*.

Further, in this embodiment, when the control circuit 128 detects based on the difference between the drain voltage and the source voltage of the FET 121*a* that the FET 121*a* is still set in the on state, while detecting that the FET 121*a* has the gate voltage lower than the on-off value so as to turn off the IGBT 110*d*, the control circuit 128 judges that an on-failure has occurred in the FET 121*a*. Accordingly, the control system 1 can reliably detect the occurrence of an on-failure in the on driving FET 121*a*.

Moreover, in this embodiment, when the control circuit 128 judges that an on-failure has occurred in the FET 121*a*, the control circuit 128 stops the operation of the power supply circuit 120 to stop the supply of the electric charge from the circuit 120 to the gate of the IGBT 110*d* through the failed FET 121*a*, to release the electric charge from the gate of the IGBT 110*d* to the ground through the FET 122*a*, and to compulsorily turn off the IGBT 110*d*. Therefore, the gate voltage of the IGBT 110*d* becomes lower than the on-off threshold value, and the IGBT 110*d* is turned off. Accordingly, the control system 1 can reliably prevent the IGBT 110*d* from being damaged or broken by heat generated in the IGBT 110.

Furthermore, when the control circuit 128 judges that an on-failure has occurred in the FET 121*a*, the control circuit 128 externally outputs an abnormal signal different from a signal normally output. Accordingly, the control system 1 can inform an outer part of the occurrence of an on-failure.

In this embodiment, when the control circuit 128 detects based on the difference between the drain voltage and the source voltage of the FET 121*a* that the FET 121*a* is still set in the on state, while detecting that the FET 121*a* has the gate voltage lower than the on-off value to be set in the off state, the control circuit 128 judges that an on-failure has occurred in the FET 121*a*. However, when the control circuit 128 detects that the voltage difference between the drain and the source of the FET 121*a* is set at a value corresponding to the on state of the FET 121*a* during a period of time longer than the switching period of time predetermined for the switching operation of the IGBTs 110*a* to 110*f*, the control circuit 128 may judge that an on-failure has occurred in the FET 121*a* (first modification). Further, when the voltage difference between the drain and the source of the FET 121*a* indicates the on state of the FET 121*a* while the driving signal received in the control circuit 128 instructs the IGBT 110*d* to be set in the off state, the control circuit 128 may judge that an on-failure has occurred in the FET 121*a* (second modification). In any modification, the on-failure of the FET 121*a* can be reliably detected.

Further, in this embodiment, when the control circuit 128 judges that an on-failure has occurred in the FET 121*a*, the control circuit 128 stops the operation of the circuit 120 to stop the apply of the voltage from the circuit 120 to the gate of the IGBT 110*d* through the failed FET 121*a* and to compulsorily turn off the IGBT 110*d*. However, when judging the occurrence of an on-failure, the control circuit 128 may control the off holding FET 123*a* as a component acting so as to turn off the IGBT 110*d* (third modification). More specifically, the control circuit 128 may turn on the off holding FET 123*a* in addition to the FET 122*a* in response to the occurrence of an on-failure. The electric charge at the gate of the IGBT 110*d* is released through the path passing through the turned-on FET 123*a* in addition to the path passing through the turned-on FET 122*a*, the control system 1 can reliably turn off the IGBT 110*d* so as to prevent the IGBT 110*d* from overheating or being damaged or broken by heat generated in the IGBT 110*d*.

Further, when judging the occurrence of an on-failure in the on driving FET 121*a*, the control circuit 128 may control the IGBT 110*d*, to be set in the on state. In this case, when the IGBT 110*a* (see FIG. 1) arranged in series with the IGBT 110*d* is turned on, the IGBTs 110*a* and 110*d* serially connected with each other are set in the on state together, and a short-circuit current flows through the IGBT 110*a* and the IGBT 110*d*. This short-circuit current flowing through the IGBT 110*a* is detected in a short-circuit current detecting circuit (not shown) connected with the gate (i.e., a control terminal) of to the IGBT 110*a*, and a control circuit (i.e., a driving circuit not shown) controlling the IGBT 110*a* controls a cutoff circuit (not shown) connected with the gate of to the IGBT 110*a* to release the electric charge accumulated at the gate of the IGBT 110*a* to the ground and to compulsorily turn off the IGBT 110*a*. In response to the turning off of the IGBT 110*a*, the short-circuit current flowing through the IGBT 110*d* is cut off. Therefore, even when the IGBT 110*d* is set in the on state, substantially no current flows through the IGBT 110*d*. Accordingly, the control system 1 can reliably prevent the IGBT 110*d* from overheating or being damaged or broken by heat generated in the IGBT 110*d*.

Second Embodiment

A motor control system according to the second embodiment has an inverter composed of six IGBTs and six resistors in the same manner as the inverter 11 of the control system 1 shown in FIG. 1.

Figure 3:
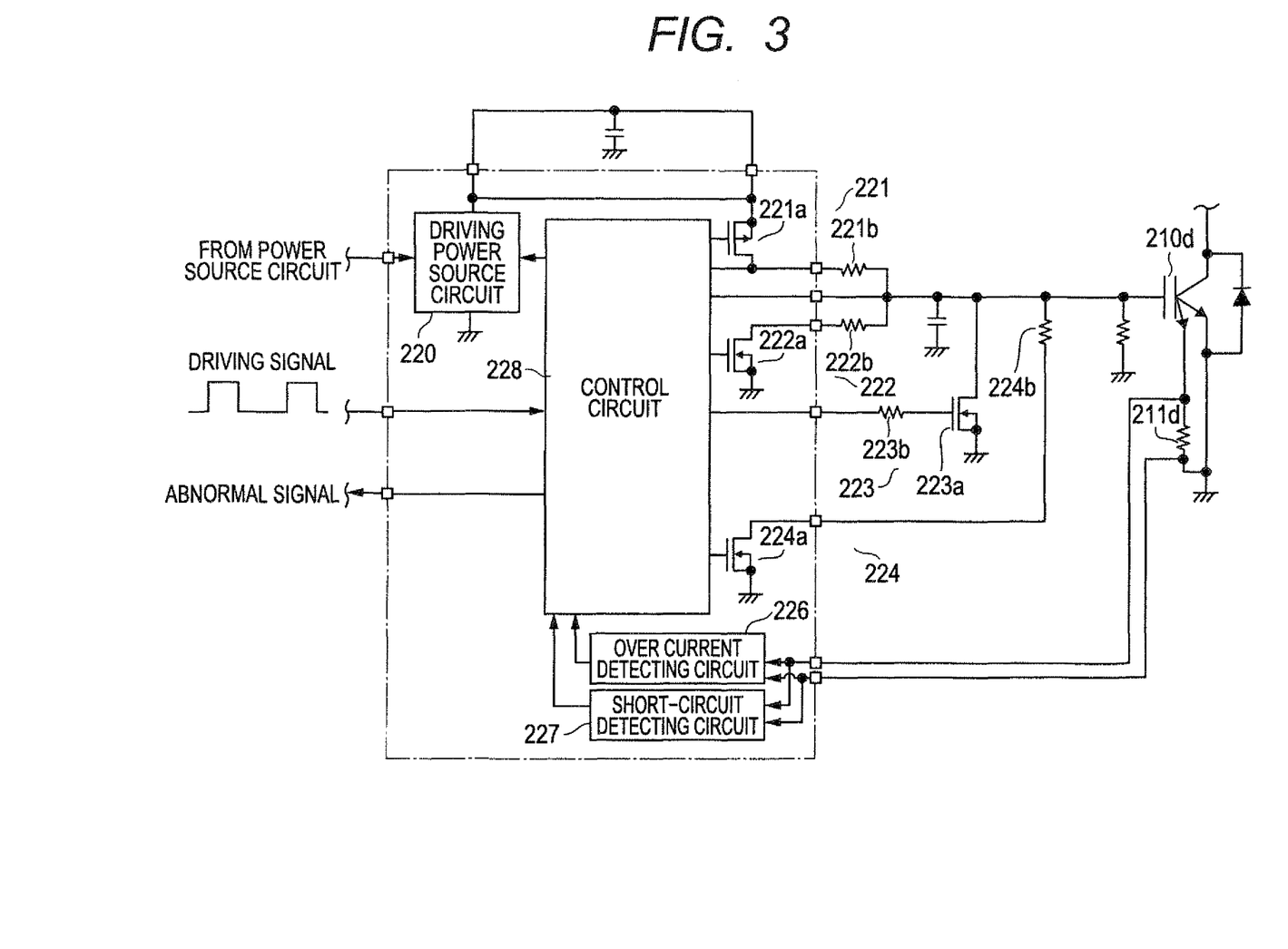
FIG. 3 is a circuit view of a control unit in a motor control system according to the second embodiment of the present invention.

FIG. 3 is a circuit view of a control unit 22 according to the second embodiment. As shown in FIG. 3, the control unit 22 controls an IGBT 210*d* representing the IGBTs. The IGBT 210*d* and a current sensing resistor 211*d* correspond to the IGBT 110*d* and the resistor 111*d*, respectively. The control unit 22 has a driving power source circuit 220, an on driving circuit 221 having an on driving FET 221*a* and an on driving resistor 221*b*, an off driving circuit 222 having an off driving FET 222*a* and an off driving resistor 222*b*, an off holding circuit 223 having an off holding FET 223*a* and an off holding resistor 223*b*, a cutoff circuit 224 having a cutoff FET 224*a* and a cutoff resistor 224*b*, an overcurrent detecting circuit 226, a short-circuit detecting circuit 227 and a control circuit 228. The configuration of the circuits 220 to 228 is the same as the configuration of the circuits 120 to 128 shown in FIG. 2 except that the drain of the on driving FET 221*a* is not connected with the control circuit 228.

Although the control circuit 128 according to the first embodiment judges based on the gate voltage, the drain voltage and the source voltage of the FET 121*a* whether or not an on-failure has occurred in the FET 121*a* (see FIG. 2), the control circuit 228 according to the second embodiment judges based on the gate voltage and the drain voltage of the FET 221*a* whether or not an on-failure has occurred in the FET 221*a*.

Next, a judgment on an on-failure occurring in the on driving FET 221*a* will be described with reference to FIG. 3. The control circuit 228 shown in FIG. 3 detects a difference in voltage between ends of the resistor 221*b* and estimates or detects a current flowing through the FET 221*a* from the detected voltage difference. When the circuit 228, which sets the gate voltage of the FET 221*a* so as to set the FET 221*a* in the off state, judges that a current flows through the FET 221*a*, the circuit 228 judges that an on-failure has occurred in the FET 221*a*. Then, in the same manner as in the control system 1, the circuit 228 stops the operation of the circuit 220 to stop the supply of the electric charge from the circuit 220 to the gate of the IGBT 210*d* through the FET 221*a* and to compulsorily turn off the IGBT 210*d*.

Accordingly, the control system according to the second embodiment can reliably detect the occurrence of an on-failure in the FET 221*a*.

Further, because the control circuit 228 estimates a current flowing through the FET 221*a* from the voltage difference between the ends of the resistor 221*b*, the control system does not require any resistor only used to detect a current flowing through the FET 221*a*.

Accordingly, the configuration of the control system can be simplified.

Third Embodiment

A motor control system according to the third embodiment has an inverter composed of six IGBTs and six resistors in the same manner as the inverter 11 of the control system 1 shown in FIG. 1. In the first embodiment, in response to the occurrence of an on-failure in one on driving FET, the circuit 128 stops the operation of the power supply circuit 120 to compulsorily turn off the corresponding IGBT. In contrast, in the third embodiment, in response to the occurrence of an on-failure in one on driving FET, the gate voltage of the corresponding IGBT is clamped to a value equal to or lower than the off holding threshold value to turn off the IGBT.

Figure 4:
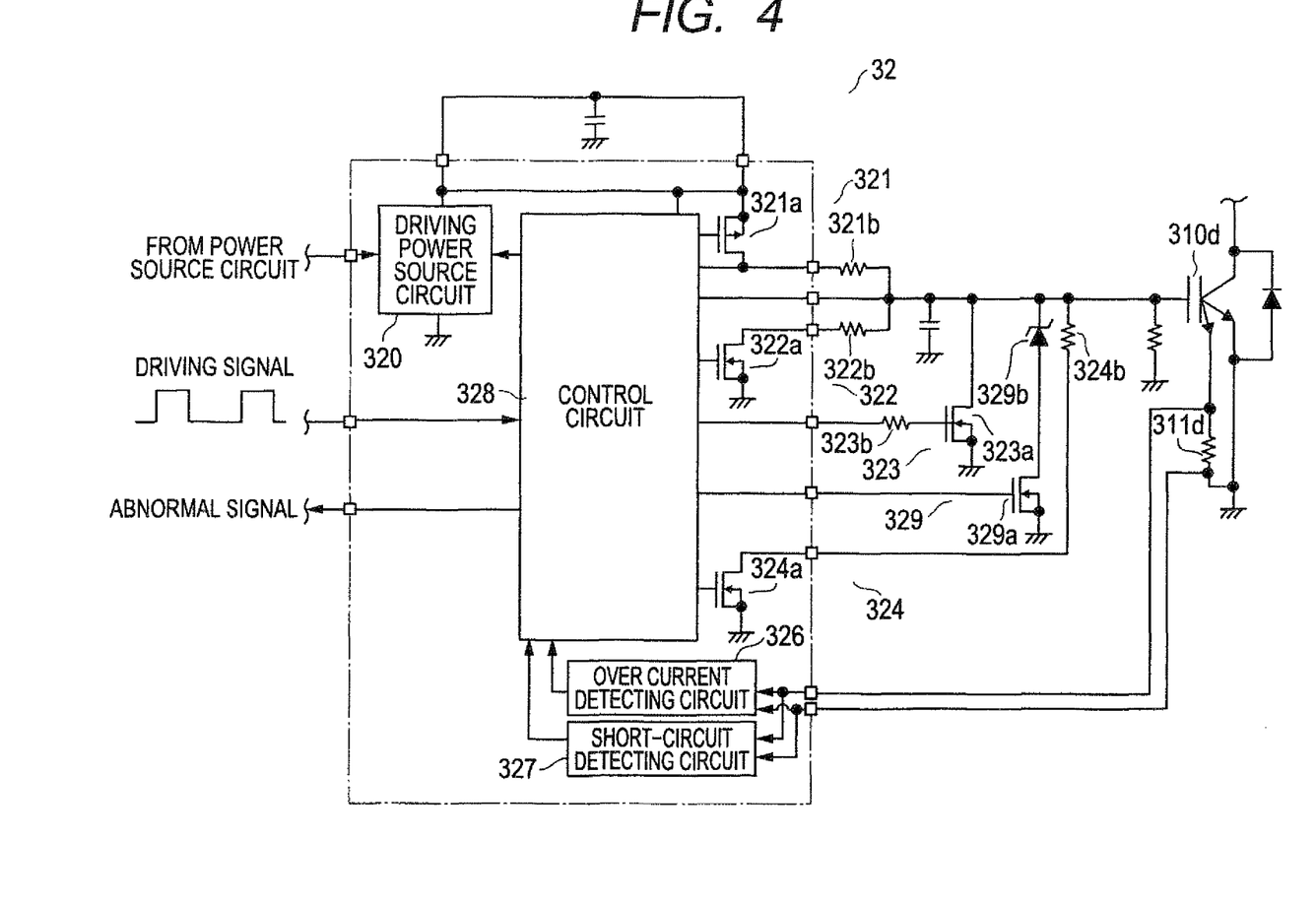
FIG. 4 is a circuit view of a control unit in a motor control system according to the third embodiment of the present invention.

FIG. 4 is a circuit view of a control unit 32 according to the third embodiment. As shown in FIG. 4, the control unit 32 controls an IGBT 310*d* representing the IGBTs. The IGBT 310*d* and a current sensing resistor 311*d* correspond to the IGBT 110*d* and the resistor 111*d*, respectively. The control unit 32 has a driving power source circuit 320, an on driving circuit 321 having an on driving FET 321*a* and an on driving resistor 321*b*, an off driving circuit 322 having an off driving FET 322*a* and an off driving resistor 322*b*, an off holding circuit 323 having an off holding FET 323*a* and an off holding resistor 323*b*, a cutoff circuit 324 having a cutoff FET 324*a* and a cutoff resistor 324*b*, an overcurrent detecting circuit 326, a short-circuit detecting circuit 327 and a control circuit 328. The configuration of the circuits 320 to 328 is the same as the configuration of the circuits 120 to 128 shown in FIG. 2.

The control unit 32 further has a voltage clamp circuit 329 for clamping the gate voltage of the IGBT 310*d* at a value equal to or lower than the off holding threshold value. The circuit 329 is composed of a voltage clamp FET 329*a* formed of an n-channel MOSFET and a constant voltage diode 329*b*. The anode of the diode 328*b* is connected with the drain of the FET 329*a*, and the cathode of the diode 328*b* is connected with the gate of the IGBT 310*d*. The source of the FET 329*a* is connected with the ground prepared for the battery B1 so as to be insulated from the vehicle body. Therefore, the source of the FET 329*a* is substantially connected with the negative terminal of the circuit 320 and the emitter of the IGBT 310*d* through the ground. The drain of the FET 329*a* is connected with the gate of the IGBT 310*d* through the diode 329*b*. The gate of the FET 329*a* is connected with the control circuit 328. When the control circuit 328 turns on the FET 329*a*, the diode 329*b* applies a constant voltage equal to or lower than the off holding threshold value to the gate of the IGBT 310*d*. Therefore, the FET 329*a* acts as a switching element.

Next, an operation of the control unit 32 performed in response to a judgment on an on-failure occurring in the on driving FET 321*a* will be described with reference to FIG. 4. When the control circuit 328 judges that an on-failure has occurred in the on driving FET 321*a* in the same manner as in the first or second embodiment, the control circuit 328 applies a high voltage to the gate of the FET 329*a* to turn on the FET 329*a*, and the diode 329*b* applies a constant voltage equal to or lower than the off holding threshold value to the gate of the IGBT 310*d*. Then, the control circuit 328 detects the gate voltage of the IGBT 310*d* set to be equal to or lower than the off holding threshold value, and applies a high voltage to the gate of the off holding FET 323*a* to turn on the FET 323*a*. Then, the electric charge at the gate of the IGBT 310*d* is released to the ground through the FET 323*a*, and the IGBT 310*d* is turned off.

As described above, because the voltage clamp circuit 329 clamps the gate voltage of the IGBT 310*d* at a value equal to or lower than the off holding threshold value in response to the occurrence of an on-failure in the on driving FET 321*a*, the off holding circuit 323 automatically releases the electric charge accumulated at the gate of the IGBT 310*d* to the ground. Accordingly, the control system can compulsorily turn off the IGBT 310*d* in response to the occurrence of an on-failure in the on driving FET 321*a*, and can prevent the IGBT 310*d* from being damaged or broken by heat generated in the IGBT 310*d*.

Fourth Embodiment

A motor control system according to the fourth embodiment has an inverter composed of six IGBTs and six resistors in the same manner as the inverter 11 of the control system 1 shown in FIG. 1. In this embodiment, in response to the occurrence of an on-failure in one on driving FET, the connection between the gate of the corresponding IGBT and the failed on driving FET is cut off.

Figure 5:
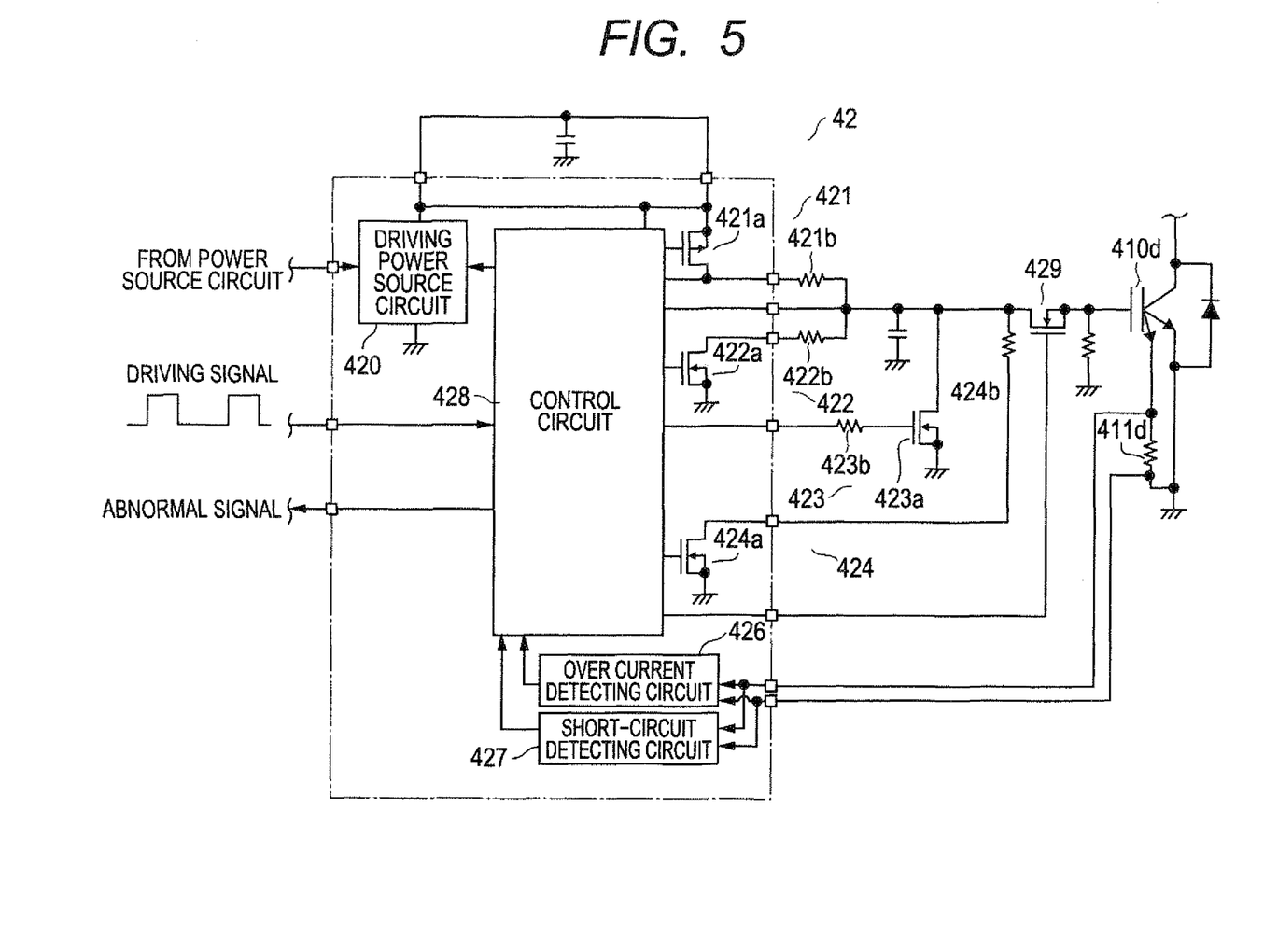
FIG. 5 is a circuit view of a control unit in a motor control system according to the fourth embodiment of the present invention.

FIG. 5 is a circuit view of a control unit 42 according to the fourth embodiment. As shown in FIG. 5, the control unit 42 controls an IGBT 410*d* representing the IGBTs. The IGBT 410*d* and a current sensing resistor 411*d* correspond to the IGBT 110*d* and the resistor 111*d*, respectively. The control unit 42 has a driving power source circuit 420, an on driving circuit 421 having an on driving FET 421*a* and an on driving resistor 421*b*, an off driving circuit 422 having an off driving FET 422*a* and an off driving resistor 422*b*, an off holding circuit 423 having an off holding FET 423*a* and an off holding resistor 423*b*, a cutoff circuit 424 having a cutoff FET 424*a* and a cutoff resistor 424*b*, an overcurrent detecting circuit 426, a short-circuit detecting circuit 427 and a control circuit 428. The configuration of the circuits 420 to 428 is the same as the configuration of the circuits 120 to 128 shown in FIG. 2.

The control unit 42 further has a gate cutoff FET (i.e., a gate cutoff switching element) 429 acting as a switching element to cut off the connection between the gate of the IGBT 410*d* and the pair of the FET 421*a* and the FET 422*a* in response to the occurrence of an on-failure in the on driving FET 421*a*. The FET 429 is formed of an n-channel MOSFET. The source of the FET 421*a* is connected with the gate of the IGBT 410*d*, and the drain of the FET 421*a* is connected with the FET 421*a* and the FET 422*a* through the resistors 421*b* and 422*b*. The gate of the FET 421*a* is connected with the control circuit 428.

Next, an operation of the control unit 42 performed in response to a judgment on an on-failure occurring in the on driving FET 421*a* will be described with reference to FIG. 5. When the control circuit 428 judges that an on-failure has occurred in the on driving FET 421*a* in the same manner as in the first or second embodiment, the control circuit 428 outputs an off signal of a low voltage to the gate of the FET 429 to turn off the FET 429, and the turned-off FET 429 disconnects the gate of the IGBT 410*d* from the on driving FET 421*a* and the off driving FET 422*a*. Therefore, the supply of electric charge from the circuit 420 to the gate of the IGBT 410*d* is stopped, the electric charge accumulated at the gate of the IGBT 410*d* is released to the ground through a resistor disposed between the gate of the IGBT 410d and the PET 429, and the IGBT 410d is turned off.

As described above, because the control system controls the FET 429 to disconnect the gate of the IGBT 410d from the failed FET 421a, the supply of electric charge from the circuit 420 to the gate of the IGBT 410d is stopped. Accordingly, the control system can turn off the IGBT 410d in response to the occurrence of an on-failure in the on driving FET 421a, and can prevent the IGBT 410d from being broken by heat generated in the IGBT 410d.

In this embodiment, the FET 429 arranged between the gate of the IGBT 410d and the pair of the FETs 421a and 422a is located so as to connect the circuits 423 and 424 with the drain of the FET 429. However, the FET 429 may be located so as to connect the circuits 423 and 424 with the source of the FET 429. In this case, the electric charge can be released from the gate of the IGBT 410d disconnected from the failed FET 421a to the ground through the circuit 423. Further, the FET 429 may be located so as to connect the circuits 422 to 424 with the source of the FET 429. In this case, the electric charge can be released from the gate of the IGBT 410d, disconnected from the failed FET 421a, to the ground through the circuits 422 and 423.

What is claimed is:

1. An electronic system, comprising:
    a first switching element, having a control terminal, which is driven by changing a voltage of the control terminal in response to electric charge supplied or released to/from the control terminal;
    an on driving switching element, connected with the control terminal of the first switching element, which is set to an on state in order to supply electric charges to the control terminal of the first switching element;
    an off driving switching element, connected with the control terminal of the first switching element, which is set to an on state in order to release the electric charges, supplied by the on driving switching element, from the control terminal of the first switching element;
    a control circuit which controls each of the on driving switching element and the off driving switching element according to a driving signal to set the switching element in to the on or off state and to control the voltage of the control terminal of the first switching element and which controls the driving of the first switching element;
    a protecting circuit which detects a short and/or an overcurrent state of the first switching element, and then if that the short and/or the overcurrent state of the first switching element has occurred, makes the first switching element turn off using an element that switches the first switching element off slower than the off driving switching element; and
    an element, that switches the first switching element off faster than the off driving switching element, connected with the control terminal of the first switching element,
    wherein the control circuit, in a case where an on-failure occurs in the on driving switching element, sets the first switching element to an off state using the element that switches the first switching element off faster than the off driving switching element notwithstanding whether or not the first switching element is the short and/or the overcurrent state.

2. The electronic system according to claim 1, wherein the on driving switching element has a control terminal, an input terminal and an output terminal and is driven by controlling a voltage of the control terminal of the on driving switching element, and the control circuit determines that the on-failure has occurred in the on driving switching element, in an event that a voltage between the input terminal and the output terminal of the on driving switching element indicates a time when the on driving switching element turns on notwithstanding the voltage of the control terminal of the on driving switching element indicating that the on driving switching element would not turn on.

3. The electronic system according to claim 1, wherein the on driving switching element has a control terminal, an input terminal and an output terminal and is driven by controlling a voltage of the control terminal of the on driving switching element, the control circuit alternately sets the first switching element to each of the on and off states at a certain switching time interval according to the driving signal, and the control circuit determines that the on-failure has occurred in the on driving switching element in an event that a voltage between the input terminal and the output terminal of the on driving switching element indicates, during longer than the certain switching time interval, a time when the on driving switching element turns on.

4. The electronic system according to claim 1, wherein the on driving switching element has a control terminal, an input terminal and an output terminal and is driven by controlling a voltage of the control terminal of the on driving switching element, and the control circuit determines that the on-failure has occurred in the on driving switching element, in an event that a voltage between the input terminal and the output terminal of the on driving switching element indicates a time when the on driving switching element turns on notwithstanding the control circuit outputting the driving signal so as to make the first switching element turn off.

5. The electronic system according to claim 1, wherein the on driving switching element has a control terminal and is driven by controlling a voltage at the control terminal of the on driving switching element, and the control circuit determines that the on-failure has occurred in the on driving switching element in an event that an electric current flows through the on driving switching element notwithstanding a voltage of the control terminal of the on driving switching element corresponding to a voltage that the on driving switching element would not turn on.

6. The electronic system according to claim 5, wherein the on driving switching element is connected with the control terminal of the first switching element through an on driving resistor, and the control circuit detects, based on a voltage difference between ends of the on driving resistor, an electric current flows through the on driving switching element.

7. The electronic system according to claim 1, wherein the electronic system further comprises s a driving power source circuit that supplies a driving voltage required to drive the first switching element, and the control circuit stops the supply of the driving voltage from the driving power source circuit, when the control circuit has judged that the on-failure has occurred in the on driving switching element, to set the first switching element to the off state.

8. The electronic system according to claim 1, wherein the electronic system comprises an off holding switching element connected with the control terminal of the first switching element, as the element that switches the first switching element off faster than the off driving switching element, which releases electric charges from the control terminal of the first switching element when the off holding switching element has been set to turn on by the control circuit, and
    the control circuit:
        if a voltage of the control terminal of the first switching element has become equal to or lower than an off holding threshold value which is lower than an on-off threshold value, controls the off holding switching element so as to hold the off state of the first switching element, and if the control circuit has judged that the on-failure has occurred in the on driving switching element. controls the off holding switching element so as to set the first switching element to the off state.

9. The electronic system according to claim 1, wherein the electronic system comprises an off holding switching element connected with the control terminal of the first switching element, as the element that switches the first switching element off faster than the off driving switching element, which releases the electric charges from the control terminal of the first switching element when the off holding switching element has been set to turn on by the control circuit, and a voltage clamp circuit connected with the control terminal of the first switching element, as the element that switches the first switching element off faster than the off driving switching element, which clamps a voltage of a control terminal of the first switching element at a value equal to or lower than an off holding threshold value which is lower than an on-off threshold value, and the control circuit:
if a voltage of the control terminal of the first switching element has becomes equal to or lower than an off holding threshold value which is lower than the on-off threshold value, controls the off holding switching element to hold the off state of the first switching element, and if the control circuit has judged that the on-failure has occurred in the on driving switching element, controls the clamp circuit so as to clamp the voltage of the control terminal of the first switching element at a value equal to or lower than the off holding threshold value.

10. The electronic system according to claim 1, wherein the electronic system further comprises a second switching element, serially connected with the first switching element and having a control terminal, which is driven according to control of a voltage of the control terminal of the second switching element by the control circuit, and a driving circuit that drives the second switching element by controlling a voltage of the control terminal of the second switching element based on an inputted driving signal thereto and sets the second switching element to an off state when an abnormal electric current flows through the second switching element, wherein the control circuit sets the first switching element to an on state if the control circuit has judged that the on-failure has occurred in the on driving switching element.

11. The electronic system according to claim 1, wherein the electronic system further comprises a gate cutoff switching element connected with the control terminal of the first switching element, as the element of the protecting circuit that switches the first switching element off slower than the off driving switching element, wherein the control circuit, if the control circuit has judged that the on-failure has occurred in the on driving switching element, controls the gate cutoff switching element so as to cut off a control terminal of the first switching element from the on driving switching element and the off driving switching element.

12. The electronic system according to claim 1, wherein the control circuit outputs an abnormal signal outside if the control circuit has judged that the on-failure has occurred in the on driving switching element.

\* \* \* \* \*